US010750759B2

(12) United States Patent
de Man et al.

(10) Patent No.: US 10,750,759 B2
(45) Date of Patent: Aug. 25, 2020

(54) EDIBLE WATER-IN-OIL EMULSIONS AND A PROCESS FOR PREPARING SUCH EMULSIONS

(71) Applicant: Upfield US Inc., Englewood Cliffs, NJ (US)

(72) Inventors: Teunis de Man, Maassluis (NL); Henelyta Santos Ribeiro, Asselheim (DE)

(73) Assignee: UPFIELD EUROPE B.V., Rotterdam (NL)

( * ) Notice: Subject to any disclaimer, the term of this patent is extended or adjusted under 35 U.S.C. 154(b) by 502 days.

(21) Appl. No.: 14/429,415

(22) PCT Filed: Sep. 3, 2013

(86) PCT No.: PCT/EP2013/068184
§ 371 (c)(1),
(2) Date: Mar. 19, 2015

(87) PCT Pub. No.: WO2014/044523
PCT Pub. Date: Mar. 27, 2014

(65) Prior Publication Data
US 2015/0230488 A1 Aug. 20, 2015

(30) Foreign Application Priority Data
Sep. 21, 2012 (EP) .................................... 12185433

(51) Int. Cl.
A23D 9/007 (2006.01)
A23D 7/02 (2006.01)
A23D 7/00 (2006.01)
A23D 7/005 (2006.01)

(52) U.S. Cl.
CPC ............. A23D 9/007 (2013.01); A23D 7/001 (2013.01); A23D 7/0056 (2013.01); A23D 7/02 (2013.01)

(58) Field of Classification Search
CPC ......... A23D 7/0056; A23D 7/04; A23D 9/007
USPC ............................................... 426/417, 603
See application file for complete search history.

(56) References Cited

U.S. PATENT DOCUMENTS

| 3,973,053 | A | * | 8/1976 | Galusky ................... A23D 9/05 426/601 |
| 4,305,970 | A | | 12/1981 | Moran et al. |
| 4,533,561 | A | | 8/1985 | Ward |
| 5,834,043 | A | * | 11/1998 | Van Den Berg ....... A21D 2/181 426/34 |
| 6,056,791 | A | | 5/2000 | Weidner et al. |
| 6,231,914 | B1 | * | 5/2001 | Huizinga ................ A23D 7/001 426/601 |
| 2005/0276900 | A1 | | 12/2005 | Ullanoormadam | |
| 2006/0280855 | A1 | * | 12/2006 | Van Den Berg ..... A23D 7/0053 426/601 |
| 2007/0141123 | A1 | * | 6/2007 | Zawistowski .......... A61K 31/56 424/439 |
| 2008/0254193 | A1 | * | 10/2008 | Edelman ............... A23D 7/0056 426/602 |
| 2011/0293812 | A1 | | 12/2011 | Dobenesque et al. |

FOREIGN PATENT DOCUMENTS

| EP | 0101105 | 2/1984 |
| EP | 0264149 | 4/1988 |
| EP | 0304131 | 2/1989 |
| EP | 0564738 | 10/1993 |
| EP | 0744992 | 10/1997 |
| EP | 1114674 | 9/2008 |
| EP | 1285584 | 11/2009 |
| EP | 2181604 | 5/2010 |
| EP | 1651338 | 5/2011 |
| EP | 2362736 | 12/2012 |
| WO | WO0105241 | 1/2001 |
| WO | WO2005014158 | 2/2005 |
| WO | WO2006079445 | 8/2006 |
| WO | WO2006087090 | 8/2006 |
| WO | WO2006087091 | 8/2006 |
| WO | WO2006087092 | 8/2006 |
| WO | WO2006087093 | 8/2006 |
| WO | WO2010053360 | 5/2010 |
| WO | WO2010069746 | 6/2010 |
| WO | WO2010069747 | 6/2010 |
| WO | WO2010069750 | 6/2010 |
| WO | WO2010069751 | 6/2010 |
| WO | WO2010069752 | 6/2010 |
| WO | WO2010069753 | 6/2010 |

(Continued)

OTHER PUBLICATIONS

Written Opinion in EP13758844, dated Mar. 21, 2017.
Experimental and Analytical Facilities, Delft University of Technology, Dec. 16, 2005, pp. 41-51.
IPRP2 in PCTEP2013068184, Dec. 23, 2014.
Margarines and Shortenings, Ullmanns Encyclopedia of Industrial Chemistry, 1990, pp. 156-158, vol. A16.
P. Munuklu, Particle formation of edible fats using the supercritical melt micronization process (ScMM), The Journal of Supercritical Fluids, 2007, pp. 181-190, 43.
S. P. Kochhar, Influence of Processing on Sterols of Edible Vegetable Oils, Prog Lipid Res, 1983, pp. 161-188, vol. 22.
Search Report in EP12185410, dated Feb. 26, 2013.

(Continued)

Primary Examiner — Erik Kashnikow
Assistant Examiner — Bhaskar Mukhopadhyay
(74) Attorney, Agent, or Firm — Arent Fox LLP

(57) ABSTRACT

The invention relates to a process for the manufacture of an edible water-in-oil emulsion comprising 10 to 85 wt. % of liquid oil, 0.5 to 50 wt. % of hardstock fat, 10 to 85 wt. % of a dispersed water-phase; comprising the steps of: a) providing a first water-in-oil emulsion; b) providing a second water-in-oil emulsion; and c) mixing said first and second emulsion to provide a finished edible water-in-oil emulsion. The invention further relates to water-in-oil emulsions having a distinct water-phase release profile.

15 Claims, No Drawings

(56) References Cited

FOREIGN PATENT DOCUMENTS

WO    WO2011160921    12/2011

OTHER PUBLICATIONS

Search Report in EP12185433, dated Mar. 6, 2013, EP.
Search Report in PCTEP2013068184, dated Oct. 14, 2013, WO.
Search Report in PCTEP2013068773, dated Oct. 24, 2013.
Van Den Enden et al., A Method for the Determination of the Solid Phase Content of Fats Using Pulse Nuclear Magnetic Resonance, Fette Seifen Anstrichmittel, 1978, pp. 180-186, vol. 80.
Written Opinion in EP12185433, dated Mar. 6, 2013, EP.
Written Opinion in PCTEP2013068184, dated Sep. 5, 2014.
Written Opinion in PCTEP2013068773, dated Oct. 24, 2013.
Julia Weiss and Gerald Muschiolik; Factors Affecting the Droplet Size of Water-in-Oil Emulsions (W/O) and the Oil Globule Size in Water-in-Oil-in-Water Emulsions (W/O/W); Journal of Dispersion Science and Technology ; 2007; 703-716; vol. 28; Taylor & Francis.
Neha B. Raikar; Prediction and Manipulation of Drop Size Distribution of Emulsions Using Population Balance Equation Models for High Pressure Homogenization; University of Massachusetts Amherst ScholarWorks@UMass Amherst; 2010; 1-155.

\* cited by examiner

EDIBLE WATER-IN-OIL EMULSIONS AND A PROCESS FOR PREPARING SUCH EMULSIONS

FIELD OF INVENTION

The present invention relates to a process for the preparation of an edible water-in-oil emulsion by mixing of at least two other water-in-oil emulsions. Furthermore, the invention relates to edible water-in-oil emulsions comprising 10 to 85 wt. % of a dispersed water-phase and 15 to 90 wt. % of total fat.

BACKGROUND OF INVENTION

Edible water-in-oil emulsions (W/O emulsions) like e.g. margarine and low fat spreads are well known food products that comprise a continuous fat-phase and a dispersed water-phase.

Margarine is generally defined as a composition containing at least 80 wt. % of fat and about 20 wt. % of a water-phase. In contrast, emulsions containing less than 80 wt. % of fat are generally called spreads. Nowadays the terms margarine and spread are often used interchangeably although in some countries the commercial use of the term margarine is subject to certain regulatory requirements. The main difference between margarine and spread is the amount of fat. For the purpose of the present invention the terms margarine and spread are used interchangeably.

The fat-phase of margarine and similar edible W/O emulsions comprises a mixture of liquid oil (i.e. fat that is liquid at ambient temperature) and fat which is solid at ambient temperature. The liquid oil fraction typically comprises liquid unmodified vegetable oil such as soybean oil, sunflower oil, linseed oil, low erucic rapeseed oil (Canola), corn oil (maize oil) and blends of vegetable oils. The solid fat, also called structuring fat or hardstock fat, serves to structure the fat-phase by forming a fat crystal network throughout the continuous oil-phase. It also helps to stabilize the emulsion. The droplets of the water-phase are fixed within the spaces of the lattice of solid fat crystals. This prevents coalescence of the droplets and separation of the heavier water-phase from the fat-phase.

For an edible water-in-oil emulsion, ideally the structuring fat has such properties that it melts or dissolves at in-mouth conditions, otherwise the product may have a heavy and/or waxy mouthfeel. An important indicator is the temperature at which a water-in-oil emulsion breaks up. Preferably the water-in-oil emulsion breaks up at in-mouth conditions to provide a good oral response. Furthermore, the overall organoleptic impression should be smooth and preferable no perceivable grains should be present upon ingestion as this may result in what is generally known as a 'sandy', 'grainy' and/or 'lumpy' mouthfeel.

Triacylglycerols (TAGs), also known as triglycerides, are the major constituents of natural fats and oils and are esters of glycerol and fatty acids. The chemical structure of the fatty acid and the distribution of the fatty acids over the glycerol backbone determine (at least partly) the physical properties of a fat. The physical properties of fats, like for example the solid fat content (SFC) expressed as N-value, can be modified by altering the chemical structure of the fat. Well known techniques that are widely used include hydrogenation and interesterification.

Water-in-oil emulsions are typically made by either the votator or churn process; or by a process which involves the use of fat powder comprising hardstock fat.

The general process for the manufacture of emulsions via the votator or churn process encompasses the following steps:
1. Mixing of the liquid oil, the hardstock fat and if present the water-phase at a temperature at which the hardstock fat is definitely liquid;
2. cooling of the mixture under high shear to induce crystallization of the hardstock fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

The general process for the manufacture of emulsions by use of fat powder comprising hardstock fat (i.e. pre-crystallized fat) encompasses the following steps:
a. mixing of fat powder and liquid oil to provide a slurry;
b. providing a water-phase;
c. mixing the slurry and the water-phase to form a fat-continuous emulsion, wherein the fat-powder is typically not subjected to a temperature at which the fat powder will substantially melt.

A commonly used type of fat powder is micronized fat powder, which is for example obtainable by a Super Critical Melt Micronisation process, as described in J. of Supercritical Fluids 43 (2007) 181-190 and EP1651338.

One of the benefits of the use of fat powder for emulsions, in comparison with the votator or churn process is a reduction in energy requirement, a broader range of fat suitable as hardstock fat and that it allows a reduction in SAFA.

Important quality-aspects of edible water-in-oil emulsions are for example hardness, spreadability and stability (e.g. storage stability and the ability to withstand temperature cycling). Temperature cycling means that the product is subjected to low and high temperatures (e.g. when the consumer takes the product out of the refrigerator and leaves it for some time at the table prior to use). An inadequate stability may for example lead to destabilization of the emulsion, oil-exudation and/or crystal growth. Another important quality aspect is the temperature at which a water-in-oil emulsion breaks up. Preferably the water-in-oil emulsion breaks up at in-mouth conditions to provide a good oral response. Another important quality aspect oral response is the mouth-feel of a water-in-oil emulsion in terms of waxiness. Preferably the water-in-oil emulsion does not have a waxy mouth-feel.

Nowadays consumers and retailers place high demands on the technical specifications of W/O emulsions regarding both organoleptic experience and stability (e.g. during storage, transport and cycle stability). Therefore, there is a continual interest to improve the stability and/or organoleptic experience of W/O emulsions.

One typical way to change both the stability and the break-up temperature of W/O emulsions is to change the composition of the hardstock fat. However, we observed that modifying the hardstock fat composition to change the temperature at which a water-in-oil emulsion breaks up, can adversely affect the stability of W/O emulsions and visaversa.

Therefore there is a need to for a process which allows changing one characteristic of a W/O emulsion, such as oral response, with little or no change in a second characteristic, such as stability.

Preferably such a process involves little or no change in ingredient composition.

A single process is often used to prepare multiple types of W/O emulsion product. Examples of different products are wrappers, liquid margarine and (low-fat) spreads. It is desirable to use similar or even the same ingredients (such as the hardstock fat), possibly in different amounts, for the preparation of different types of W/O emulsion products. Use of a small number of ingredients can reduce complexity, the equipment requirement, space usage and improve the flexibility of the process.

It will be appreciated that said benefits are particularly relevant for factory scale processes. Typically, for factory scale processes, the ingredients serve the general requirements of the different products. As such, changing an ingredient to improve one product may negatively influence other products.

Therefore there is a need to for a process which allows changing one characteristic of a W/O emulsion, such as oral response, with little or no change in a second characteristic, such as stability, preferably while requiring little or no change in ingredient composition, such as hardstock fat composition.

Furthermore, there is a need W/O emulsions having an improved oral response while having good stability.

SUMMARY OF THE INVENTION

One or more of the above objectives is achieved by a process which involves mixing two W/O emulsions which differ in the amount of hardstock fat. The type of hardstock fat comprised by said two emulsions may essentially be the same it. It was found that the edible W/O emulsion obtained by said mixing surprisingly showed good stability and an improved oral response in terms of for example, an improved water-phase release above 35 degrees Celsius and/or a reduced waxiness. Surprisingly said effects could be achieved even without any change in the type or amounts of the ingredients used.

In comparison: An edible W/O emulsion of similar overall composition obtained by mixing all ingredients (e.g. liquid oil, a water-phase and hardstock fat) directly (i.e in one step) showed a reduced oral response (e.g. had a more waxy mouth-feel and poor water-phase release above 35 degrees Celsius). Furthermore, it was observed that, in such a conventional emulsion, modifying the hardstock fat composition to change the temperature at which a water-in-oil emulsion breaks up, adversely affects the stability of W/O emulsion and visa-versa.

Therefore, in a first aspect the invention relates to a process for the manufacture of an edible water-in-oil emulsion comprising:
  10 to 85 wt. % of liquid oil,
  0.5 to 50 wt. % of hardstock fat,
  10 to 85 wt. % of a dispersed water-phase,
comprising the steps of:
a. providing a first water-in-oil emulsion;
b. providing a second water-in-oil emulsion;
c. mixing said first and second emulsion to provide a finished edible water-in-oil emulsion;
wherein the wt. % of hardstock fat comprised by the first emulsion is at least 1.25 times the wt. % of hardstock fat comprised by the second emulsion, and wherein the hardstock fat comprised by the first emulsion and the hardstock fat comprised by the second emulsion are characterized by:
  a solid fat content at 20 degrees Celsius which differs at most 30 wt. %.

In other words: the hardstock fat comprised by the first emulsion and the hardstock fat comprised by the second emulsion are characterized by a N20 which differs at most by 30.

It was found that edible water-in-oil emulsions obtainable by the process according to the invention (emulsion according to the invention) have a distinctive water-release profile. In particular a distinctive difference in the profile is observed when compared to an emulsion obtained by directly mixing the ingredients (conventional emulsion). The water-release profile is determined during controlled heating, such as up to 1 degree Celsius per minute. It was found that during controlled heating, in the period up to 30 degrees Celsius there is little or no difference in the water-phase release. This is indicative of the W/O emulsion of the invention having a good stability compared to conventional emulsions. In contrast, in the period above 35 degrees Celsius it was found that the W/O emulsion of the invention will show an earlier release of part of the water-phase. This is indicative of W/O emulsion of the invention having an improved oral response compared to conventional emulsions.

Therefore, in a second aspect the invention relates to an edible water-in-oil emulsion comprising:
  10 to 85 wt. % of liquid oil,
  0.5 to 50 wt. % of hardstock fat,
  10 to 85 wt. % of a dispersed water-phase,
  wherein the hardstock fat is characterized by the following solid fat profile:
  N10 of at least 40;
  N20 of at least 20.

Optionally the emulsion has a positive Factor-A, and optionally wherein the emulsion has a water-phase release at 30 degrees Celsius of at most 10 wt. % as assessed in the following temperature protocol:
  (1) From 20 to 30 Degrees Celsius at 1 Degrees Celsius per minute
  (2) From 30 to 50 Degrees Celsius at 0, 2 Degrees Celsius per minute
  (3) From 50 to 70 Degrees Celsius at 1 Degrees Celsius per minute.

DETAILED DESCRIPTION OF THE INVENTION

Weight percentage (wt. %) is based on the total weight of the composition unless otherwise stated. It will be appreciated that the sum of the wt. % of compounds, such as of liquid oil, hardstock fat and the dispersed water-phase, as based on total weight of the composition, will not exceed 100 wt. %. The terms 'fat' and 'oil' are used interchangeably. The terms 'water-in-oil emulsion', 'W/O emulsion' and 'fat-continuous emulsion' are used interchangeably. Hardstock fat refers to a fat that is solid at ambient temperature as understood by the person skilled in the art. Ambient temperature is a temperature of about 20 degrees Celsius. The terms 'first W/O emulsion' and 'second W/O emulsion' are to distinguish these emulsions and are not meant to restrict any order in time in which they have to be provided.

Providing the First and Second Emulsions

The first and second emulsions each comprise hardstock fat, a dispersed water-phase and liquid oil. They can be made by conventional processes. Examples of suitable conventional processes include the votator or churn process and processes involving the use of fat powder comprising hardstock fat.

Preferably the fat phase of the first emulsion comprises at least 50 wt. % of vegetable fat, more preferably at least 60 wt. %, even more preferably at least 70 wt. %, even more preferably at least 80 wt. %, even more preferably at least 90 wt. % and even more preferably at least 95 wt. %. Still even more preferably the fat phase of the first emulsion comprises essentially of vegetable fat.

Preferably the fat phase of the second emulsion comprises at least 50 wt. % of vegetable fat, more preferably at least 60 wt. %, even more preferably at least 70 wt. %, even more preferably at least 80 wt. %, even more preferably at least 90 wt. % and even more preferably at least 95 wt. %. Still even more preferably the fat phase of the first emulsion comprises essentially of vegetable fat.

The hardstock fat comprised by the first W/O emulsion should have a certain likeness to the hardstock fat comprised by the second W/O emulsion. It is believed that in case the hardstock of the second emulsion has melts at an excessively higher temperature than the hardstock of the first emulsion, the improvement in oral response is diminished. It is believed that in case the hardstock of the second emulsion has melts at an excessively lower temperature than the hardstock of the first emulsion, the stability may be adversely affected.

In a process according to the invention, the weight percentage of solid fat at 20 degrees Celsius of the hardstock fat comprised by the first emulsion and the hardstock fat comprised by the second W/O emulsion differs at most 30 wt. %. (i.e. the N20 of the hardstock comprised by the first emulsion and the hardstock comprised by the second emulsion differ at most by 30). For example, in case a hardstock fat 'A', comprised by the first W/O emulsion has 20 wt. % of solid fat at 20 degrees Celsius, and a hardstock fat '13', comprised by the second W/O emulsion has 40 wt. % of solid fat at 20 degrees Celsius, the hardstock fats differ 20 wt. % in solid fat at 20 degrees Celsius (i.e. are hardstocks according to the invention). (i.e. in this example the N20 of hardstock fat 'A' and hardstock fat '13' differ by 20). Preferably, the weight percentage of solid fat at 20 degrees Celsius of the hardstock fat comprised by the first emulsion and the hardstock fat comprised by the second emulsion differs at most 20 wt. %, preferably at most 15 wt. %, more preferably at most 10 wt. %, still even more preferably at most 5 wt. % and most preferably essentially is the same.

Preferably the solid fat profile of the hardstock fat of both the first and second emulsion is characterized by the following solid fat profile:
N10 of at least 40;
N20 of at least 20;
more preferably is characterized by the following solid fat profile:
N10 of at least 40;
N20 of at least 20;
N35 of 0.5 to 90;
even more preferably is characterized by the following solid fat profile:
N10 of at least 50;
N20 of at least 30;
N35 of 10 to 70;
still even more preferably is characterized by the following solid fat profile:
N10 of at least 60;
N20 of at least 50;
N35 of 20 to 60;
still even more preferably is characterized by the following solid fat profile:
N10 of at least 80;
N20 of 70 to 95;
N35 of 30 to 50.

It is important that the wt. % of hardstock fat of the first emulsion is not the same as the wt. % of hardstock of the second emulsion. In fact, the wt. % of hardstock fat of the first W/O emulsion should be at least 1.25 times the wt. % of hardstock fat of the second emulsion. For example, in case the second W/O emulsion comprises 10 wt. % of hardstock fat, the first W/O emulsion should comprise at least 11 wt. % of hardstock fat, such as 17 wt. %. For example, in case the second W/O emulsion comprises 3 wt. % of hardstock fat, the first W/O emulsion should comprise at least 3.3 wt. % of hardstock fat, such as 5 wt. %.

Preferably the wt. % of hardstock fat comprised by the first W/O emulsion is from 1.5 to 50 times, more preferably from 1.8 to 25 times, even more preferably from 2 to 10 times and still even more preferably from 2.5 to 5 times the wt. % of hardstock fat comprised by the second W/O emulsion.

Preferably the second W/O emulsion comprises from 0.2 to 40 wt. %, more preferably 1 to 30 wt. %, even more preferably 2 to 20 wt. %, still more preferably 3 to 10 wt. % and still even more preferably 4 to 8 wt. % of hardstock fat. It will be appreciated that the first W/O emulsion will have a corresponding wt. % of hardstock fat according to the invention.

Fat Powder

Preferably the first W/O emulsion is made in a process using fat powder comprising hardstock fat and more preferably both the first and second W/O emulsions are each made using fat powder comprising hardstock fat. Use of fat powder comprising hardstock fat in the manufacture of the first and/or second W/O emulsion improves the stability of the finished W/O emulsion.

Furthermore, use of said fat powder may reduce the overall energy requirement of the process of the invention, broaden the range of fat sources suitable as hardstock fat and may allow a reduction in saturated fatty acid ester (SAFA) content.

The use of fat powder comprising hardstock fat in a process to manufacture the first or second W/O emulsion comprises the mixing of liquid oil, fat powder comprising hardstock fat, and a water-phase. The mixing of ingredients may be done in any order.

The fat powder comprises hardstock fat and preferably comprises at least 80 wt. % of hardstock fat, more preferably at least 85 wt. %, even more preferably at least 90 wt. %, still more preferably at least 95 wt. % and most preferably at least 98 wt. %. Most preferably the edible fat-powder essentially consists of hardstock fat.

Preferably the fat powder is micronized fat and more preferably said micronized fat is made by a method such as Super Critical Melt Micronisation (ScMM), also known as particles from gas saturated solutions (PGSS). This is a commonly known method and is for example described in J. of Supercritical Fluids 43 (2007) 181-190 and EP1651338.

It is important that the fat powder is not subjected to temperatures at which the hardstock fat comprised by the fat powder melts as this may severely reduce the ability of the hardstock fat to structure a W/O emulsion. The temperature at which the structuring fat melts depends on the structuring fat as used and can routinely be determined for example based on the solid fat content profile (i.e. N-lines) of the structuring fat.

Liquid Oil of the First and Second W/O Emulsion

The amount and/or composition of liquid oil comprised by the first and second W/O emulsion may be the same or may be different. The liquid oil of either of said emulsions may be a single oil or a mixture of oils, and may comprise other components. Preferably at least 50 wt. % of the oil (based on total amount of oil) is of vegetable origin, more preferably at least 60 wt. %, even more preferably at least 70 wt. %, even more preferably at least 80 wt. %, even more preferably at least 90 wt. % and even more preferably at least 95 wt. %. Still even more preferably the oil essentially consists of oil of vegetable origin. The liquid oil preferably comprises unmodified vegetable oil such as soybean oil, sunflower oil, linseed oil, low erucic rapeseed oil (Canola), corn oil (maize oil), olive oil, algae oil and blends of vegetable oils. For the purpose of this invention algae oil is considered a vegetable oil.

Preferably the first W/O emulsion comprises 20 to 80 wt. %, more preferably 30 to 60 wt. % and even more preferably 35 to 45 wt. % of total fat.

Preferably the second W/O emulsion comprises 20 to 80 wt. %, more preferably 30 to 60 wt. % and even more preferably 35 to 45 wt. % of total fat.

The wt. % of total fat comprised by the first W/O emulsion and the wt. % of total fat comprised by the second W/O emulsion may differ.

The Water-Phase of the First and Second W/O Emulsion

The water-phase is prepared according to the standard way in accordance with the chosen ingredients. The water-phase of the emulsion may suitably contain a variety of food grade ingredients, such as sodium chloride, acidulent, preservative, water-soluble flavoring, polysaccharides, minerals and water-soluble vitamins. The water-phase may also comprise liquid oil, for example to aid the inclusion of hydrophobic ingredients in the water-phase. The water-phase may also comprise proteins and non-gelling proteins, like for example dairy proteins. The water-phase may also comprise gelling and/or thickening agents like for example starches, vegetable gums, pectin and proteins suitable for such use like gelatine.

Enhancement of Desirable Taste

Preferably the edible (finished) W/O emulsion according to the invention comprises at least one compound which has and/or results in a desirable taste. For example, a compound may react with one or more other compounds in the emulsion to form a reactant having a desirable taste. Preferably said compound is selected from the list consisting of sodium chloride, monosodium glutamate, vanilla extract, yuzu, lemon juice, dairy flavour compounds, fermented milk flavour compounds, trigeminal compounds, protein and sugar; and more preferably said selected compound is a water-soluble compound. Unfortunately many of such flavour compounds are expensive and/or unhealthy when consumed in excessive amounts. An example of the former is vanilla extract. An example of the latter is sodium chloride which provides saltiness, but the excessive consumption of which is associated with high blood pressure.

The finished W/O emulsion according to the invention is made by mixing of the first and second W/O emulsion. Surprisingly it has been found that the finished W/O emulsion according to the invention may selectively enhance the taste of compounds. In particular, it was found that when consuming the finished W/O emulsion, the taste of compounds originally comprised by the water-phase of the second W/O emulsion is enhanced.

Preferably at least 55 wt. %, preferably at least 65 wt. %, more preferably at least 75 wt. %, even more preferably at least 85 wt. % and most preferably at least 95 wt. % of a compound having a desirable taste, based on the amount of said compound in the finished W/O emulsion, is present in the water-phase of the second W/O emulsion. A greater wt. % of said compound having or resulting in a desirable taste comprised by the water-phase of the second emulsion will further enhance taste.

It will be appreciated that use of the process according to the invention also provides the possibility of reducing the amount of compound with a desirable taste, without a concomitant loss of taste experience, compared to a conventional emulsion (i.e. not according to the invention). This is especially beneficial for compounds which are expensive and/or unhealthy when consumed in excessive amounts.

It will be appreciated that the classification of a compound as having a neutral, undesirable or desirable taste may depend on the specific application and/or intended use (e.g. fishy taste in ice-cream versus in fish-soup).

Preferably the first W/O emulsion comprises 20 to 80 wt. %, more preferably 40 to 70 wt. % and even more preferably 55 to 65 wt. % of a water-phase.

Preferably the second W/O emulsion comprises 20 to 80 wt. %, more preferably 40 to 70 wt. % and even more preferably 55 to 65 wt. % of a water-phase.

The wt. % of water-phase comprised by the first W/O emulsion and the wt. % of water-phase comprised by the second W/O emulsion may differ.

Compounds Comprised by the Water-Phase of the First W/O Emulsion

The W/O emulsion according to the invention preferably comprises one or more health promoting compounds, which are broadly defined as compounds which maintain and/or improve health and/or sense of well-being. Examples of such compounds are phytosterols, which are believed to have a positive effect on blood cholesterol level.

Phytosterols can be classified in three groups, 4-desmethylsterols, 4-monomethylsterols and 4,4'-dimethylsterols. In oils they mainly exist as free sterols and sterol esters of fatty acids although sterol glucosides and acylated sterol glucosides are also present. There are three major phytosterols namely beta-sitosterol, stigmasterol and campesterol. Schematic drawings of the components meant are as given in "Influence of Processing on Sterols of Edible Vegetable Oils", S. P. Kochhar; *Prog. Lipid Res.* 22: pp. 161-188. The respective 5 alpha-saturated derivatives such as sitostanol, campestanol and ergostanol and their derivatives are also encompassed in the term phytosterols. Preferably the phytosterol is selected from the group comprising β-sitosterol, β-sitostanol, campesterol, campestanol, stigmasterol, brassicasterol, brassicastanol or a mixture thereof. Suitable sources of plant sterols are for example derived from soy bean oil, tall oil, rapeseed oil or combinations of these oils.

Other examples of health promoting compounds are calcium, selenium, iron, zinc, copper, manganese and magnesium. These minerals are essential for living organisms and plays an important role in cell physiology. It will be appreciated that such minerals are preferably added in a form which allows uptake by the digestive system. For example, calcium is preferably added in the form of a salt such as tricalcium phosphate. Therefore, salts and/or complexes of these minerals or other forms which allows uptake are encompassed by these named minerals.

Many health promoting compounds, in particular sterols and minerals may form particles, such as crystals, which reduce stability and/or reduced oral response (e.g. sandy or gritty mouth-feel). This is particularly so when such compounds are formulated in the water-phase. Surprisingly it was found that when such compounds are added to the water-phase of the first W/O emulsion, the negative effect on stability and/or oral response is reduced.

Preferably the water-phase of the first water-in-oil emulsion comprises a health promoting compound and even more preferably at least one compound selected from the list consisting of calcium, selenium, iron, zinc, copper, manganese, magnesium and phytosterols.

Preferably at least 55 wt. %, preferably at least 65 wt. %, more preferably at least 75 wt. %, even more preferably at least 85 wt. % and most preferably at least 95 wt. % of a health promoting compound, based on the total wt. % of said compound in the finished W/O emulsion, is comprised by the water-phase of the first W/O emulsion. In case of compounds which form complexes, such as salts (e.g. $Ca_3PO_4$) the wt. % is based on the distribution of the health promoting part (e.g. Ca). For example, in case the water-phase of the first emulsion comprises 10 mg of $CaCO_3$ (Mw=100) and the water-phase of the second emulsion comprises 5 mg of $Ca_3(PO_4)_2$ (Mw=310), for the health promoting compound Calcium, the final emulsion will comprise about 5.9 mg of Ca. Of this 5.9 mg about 4 mg Ca was comprised by the water-phase of the first emulsion, which is 68 wt. %.

For example, if a mixture of In case of salts or other complexes, the wt. % is based on A greater wt. % of said health promoting compound comprised by the water-phase of the first emulsion will further reduce the negative impact on stability and/or oral response.

Incorporation of Compounds in the Water-Phase of the First or Second W/O Emulsion Typically said first and second W/O emulsion are made by mixing of liquid oil, a water-phase and hardstock fat. Compounds may be suitably incorporated into the water-phase before mixing with the fat-phase. For example, in case of hydrophilic compounds, said incorporation may involve simply dissolving compounds in the water-phase. For example, in case compounds form insoluble particles, said particles may be mixed with the water-phase to form a suspension. The presence of emulsifiers or gelling and/or viscosity enhancing agents may aid to keep said particles in suspension in the water-phase. In case compounds are fat-soluble, their incorporation into the water-phase may suitably involve oil droplets suspended into the water-phase. In the latter case an O/W/O emulsion is formed comprising a continuous oil phase with a water-phase dispersed as droplets wherein the water droplets themselves comprise dispersed oil droplets comprising the oil soluble compound.

Mixing of the First and Second W/O Emulsion

The process to prepare a W/O emulsion according to the invention involves mixing the first and the second W/O emulsion. In a conventional process typically the ingredients are mixed directly into a conventional W/O emulsion.

It was found that the improved oral response of the finished W/O emulsion of the invention, compared to a conventional W/O emulsion, may be achieved without a change in the ingredient composition. For example, the amounts of liquid oil, hardstock fat and water-phase, used to prepare a conventional WO emulsion, can all be split into two parts and used to provide the first and the second W/O emulsion. It will be appreciated that the amount of hardstock fat should be partitioned into two unequal amounts, wherein the first emulsion is apportioned the larger part.

Typically, in processes not according to the invention, in order to prepare new or different W/O emulsions, a change is made to the type and/or amounts of ingredients. Use of the process according to the invention allows the manufacture of more than one type of emulsion product using a smaller number and even essentially the same type and amount of ingredients. It will be appreciated that a process which uses of smaller number of ingredients may have the benefit of a reduced complexity, a smaller range of equipment which is required, reduced space usage and of improved flexibility. It will be appreciated that said benefits are particularly relevant for factory scale processes. In addition the process according to the invention may improve the characteristics one product without affecting the characteristics of other products made by with part of or all of the same ingredients. For example typically on factory scale use is made of a general purpose hardstock fat, which is used for more than one emulsion product. Changing the composition of said hardstock fat to suit the needs of any single product may adversely affect the quality of the other products. The present process allows optimizing the quality of any single emulsion product without necessarily requiring a change in the type and amount of ingredient, such as hardstock fat composition.

Preferably the first and second W/O emulsion are mixed in a weight-ratio of 1:25 to 25:1, more preferably of 1:10 to 10:1, even more preferably of 1:5 to 5:1, still more preferably of 1:3 to 3:1 and still even more preferably of 1:1.5 to 1.5:1.

The conditions during mixing of the first and second W/O emulsion can influence the properties of the final W/O emulsion to a large degree. Short residence times, low temperature during mixing and/or medium, preferably low, shear favour the formation of a W/O emulsions according to the invention.

Preferably the first and second W/O emulsion are mixed at ambient temperature or lower. Preferably the first and the second W/O emulsion are mixed at a temperature from 1 to 25, more preferably from 3 to 20, and most preferably from 5 to 15 degrees Celsius.

The shear rate and the intensity of mixing should preferably be low, as understood by the person skilled in the art. For example, the first and the second W/O emulsion can be suitably mixed by hand using a bowl and spatula. For example, the first and second W/O emulsion can be mixed in a pin-stirrer, with an internal volume of 0.5 L, at a residence time of 20 seconds and operating at 50 rpm. For example the first and second W/O emulsion can be mixed in a static mixer (Kenics-type) with internal diameter of 10 mm (Sulzer, C H) comprised of 6 elements, each having 6 blades at a flow-rate of 200 kg/h. For example the W/O emulsion may be build up by putting layers of between 0, 1 and 3 mm height of the first emulsion and second emulsion on top of each other, without need for any mixing device. For example the first and second emulsion may be mixed inline simply by bringing both streams together in a narrow tube. Suitably the first and second W/O emulsions are mixed to provide a coarse W/O emulsion according to the invention.

It will be appreciated that the degree of mixing of the first and second W/O emulsion should at least be such that both the first and second emulsion will be present in the mouth during consumption. Preferably both the first and second emulsion will on average be present in a 1 $cm^3$, more preferably in a 0.5 $cm^3$ and even more preferably 0.25 $cm^3$ volume sample of the finished W/O emulsion. It will be appreciated that the mixing equipment can be calibrated accordingly by the person skilled in the art.

Preferably the first and the second emulsion are mixed in a pin-stirrer operating at a 200, more preferably 100 and even more preferably 50 rpm. Preferably the mixing time wherein the first and second emulsion are subjected to said mixing conditions in said pin-stirrer is at most 2 minutes, more preferably at most 1 minute and more preferably at most 30 seconds.

Alternatively and preferably the first and second emulsion can be mixed using a static mixer, comprising 1-10 elements, wherein each element has 1-10 blades, wherein the internal diameter of the static mixer is from 5 to 20 mm. More preferably, the first and second emulsion can be mixed using a static mixer, comprising 4-8 elements, wherein each element has 4-8 blades, wherein the internal diameter of the static mixer is from 3 to 40 mm. Preferably the flow-rate in static mixer is at most 1000 kg per hour, more preferably at most 500 kg per hour and even more preferably at most 250 kg per hour.

It will be appreciated that preferably the first and second W/O emulsions are not mixed under high-shear for extended periods of time. Preferably the intensity of mixing should be such as would substantially prevent the aqueous phase droplets of the first emulsion of merging to a large degree with the aqueous phase droplets of the second W/O emulsion. For example, in case only to the water-phase of the second W/O emulsion is added a hydrophilic compound 'A', and only to the water-phase of the first W/O emulsion a hydrophilic compound 'B'; these compounds preferably are not homogeneously distributed over the same droplets in the finished W/O emulsion according to the invention. Preferably at most 30% more preferably at most 20% and even more preferably at most 10% of the droplets at the finished emulsion would comprise hydrophilic compounds 'A' and '13' in about the same concentration.

An example of mixing for prolonged time under high-shear, not according to the invention, is mixing the first and second W/O emulsion in a pin stirrer operating at 500 rpm or higher for at least 2 minutes or more.

The Finished W/O Emulsion

The W/O emulsion according to the invention obtainable by the process according to the invention is characterized by having a good stability and good (improved) oral response. For example the W/O emulsions have a good water-phase release, reduced waxiness, an enhanced taste of desirable compounds and/or may comprise one or more health promoting compounds without the typically associated reduced stability. Therefore, the invention also relates to W/O emulsions made according to the process of the invention.

The water-phase release of a W/O emulsion can be measured by analyzing the release of water directly or derived from the release of any compounds comprised by the water-phase. To provide an objective comparison the water-phase release is analyzed during a controlled temperature protocol. For example the water-release profile can be assessed by the following method:

A sample of 1 gram of a W/O emulsion is placed in a sample holder. The holder is made of semi-permeable material, which diffusion water-dissolved compounds, such as of ions. The sample holder is itself placed into a double walled glass vessel containing 130 millilitre of nano pure water of about 20 Degrees Celsius, which is stirred at constant speed of 50 rpm. The cooling medium flowing through the double wall was thermostated by a Lauda laboratorium water bath. The temperature protocol of the water bath was as follows:
(1) From 20 to 30 Degrees Celsius at 1 Degrees Celsius per minute
(2) From 30 to 50 Degrees Celsius at 0, 2 Degrees Celsius per minute
(3) From 50 to 70 Degrees Celsius at 1 Degrees Celsius per minute The release of the water-phase compounds can be estimated by use of conductivity and/or HPLC. The conductivity of the water-system is expressed as Ohm per cm.

It will be appreciated that the water-phase typically comprises one or more ions such as salts. Therefore, release of the water-phase can be assessed by monitoring changes in conductivity. Even in case the water-phase comprises no ions at all the release of the water-phase can be assessed by the decrease in conductivity of the buffer. Alternatively HPLC (High-Performance Liquid Chromatography) can be used to assess the release of water-phase compounds. It will be appreciated that the composition of the buffer should not be essentially the same as that of the water-phase. By use of an appropriate buffer, for example not consisting of water, even the release of water can be directly assessed using HPLC. From the release of water and/or water-phase compounds and/or changes in conductivity it will be appreciated that a skilled person can derive the wt. % of water-phase which is released.

The W/O emulsions according to the invention are stable. When subjected to the following temperature protocol
(1) From 20 to 30 Degrees Celsius at 1 Degrees Celsius per minute
(2) From 30 to 50 Degrees Celsius at 0, 2 Degrees Celsius per minute
(3) From 50 to 70 Degrees Celsius at 1 Degrees Celsius per minute,
the W/O emulsion according to the invention optionally has a water-phase release at 30 degrees Celsius which is at most 10 wt. %, preferably at most 7 wt. %, more preferably at most 5 wt. % and even more preferably at least 4 wt. %.

The finished W/O emulsion according to the invention is characterized by an improved water-phase release at in mouth conditions, leading to an improved oral response. This is shown by an earlier release of part of the water phase at a lower temperature in the temperature protocol (but above ambient temperature). In particular, this is apparent compared to a W/O emulsion made by directly mixing liquid oil, a water-phase and hardstock fat. The structure of the latter W/O emulsion can be replicated by subjecting a W/O emulsion according to the invention to excessive shear for prolonged time, for instance by mixing in a pin stirrer operating at 500 rpm or higher for at least 2 minutes or more.

Therefore, another characteristic of the W/O emulsion according to the invention is that after subjection to said excessive shear the water-release profile changes. For convenience the emulsion after subjection to excessive shear, such as mixing in a pin-stirrer, with an internal volume of 0.5 L at 500 rpm for 2 minutes, is called the HS-emulsion.

Optionally the emulsion according to the invention will show a higher wt. % of water-phase release compared to the HS-emulsion, at at least one temperature above 35 degrees Celsius, in the water-phase release profile when subjected to the following controlled temperature protocol:
(1) From 20 to 30 Degrees Celsius at 1 Degrees Celsius per minute
(2) From 30 to 50 Degrees Celsius at 0, 2 Degrees Celsius per minute
(3) From 50 to 70 Degrees Celsius at 1 Degrees Celsius per minute, The maximum difference observed in wt. % water-phase release observed at any one temperature above 35 degrees Celsius between an emulsion according to the invention and a HS-emulsion is called the Factor-A.

For example, in one specific embodiment of a W/O emulsion according to the invention, the wt. % of water-phase release at 47 degrees Celsius in said protocol was 81 wt. %. In contrast in a W/O emulsion having the same composition, but made by directly mixing liquid oil, hardstock fat and a water-phase the wt. % of water-phase released at 47 degrees Celsius in said protocol was only 50 wt. %. At 47 degrees Celsius the highest difference in water-phase release was seen and thus the W/O emulsion of that specific embodiment of the invention had a factor A of 31.

Thus, the invention further relates to an edible water-in-oil emulsion comprising:
10 to 85 wt. % of liquid oil,
0.5 to 50 wt. % of hardstock fat,
10 to 85 wt. % of a dispersed water-phase,
wherein the hardstock fat is characterized by the following solid fat profile:
N10 of at least 40;
N20 of at least 20.

Optionally the emulsion has a positive Factor-A and wherein the emulsion has a water-phase release at 30 degrees Celsius of at most 10 wt. % as assessed in the following temperature protocol:
(1) From 20 to 30 Degrees Celsius at 1 Degrees Celsius per minute
(2) From 30 to 50 Degrees Celsius at 0, 2 Degrees Celsius per minute
(3) From 50 to 70 Degrees Celsius at 1 Degrees Celsius per minute.

A W/O emulsion according to the invention will optionally have a positive Factor-A, preferably a Factor A—of at least 5, more preferably at least 10, even more preferably at least 15, even more preferably of at least 20, even more preferably of at least 25 and still even more preferably of at least 30.

Preferably the solid fat profile of the hardstock fat of the W/O emulsion according to the invention is characterized by the following solid fat profile:
N10 of at least 40;
N20 of at least 20;
N35 of 0.5 to 90;
more preferably is characterized by the following solid fat profile:
N10 of at least 50;
N20 of at least 30;
N35 of 10 to 70;
even more preferably is characterized by the following solid fat profile:
N10 of at least 60;
N20 of at least 50;
N35 of 20 to 60;
still even more preferably is characterized by the following solid fat profile:
N10 of at least 80;
N20 of 70 to 95;
N35 of 30 to 50.

Preferably the W/O emulsion according to the invention comprises from 0.5 to 50 wt. %, more preferably 1 to 35 wt. %, even more preferably 2 to 25 wt. %, still more preferably 3 to 10 wt. % and still even more preferably 4 to 10 wt. % of hardstock fat.

Preferably the W/O emulsion according to the invention comprises 20 to 80 wt. %, more preferably 40 to 70 wt. % and even more preferably 55 to 65 wt. % of a water-phase.

Preferably the W/O emulsion according to the invention comprises 20 to 80 wt. %, more preferably 30 to 60 wt. % and even more preferably 35 to 45 wt. % of total fat.

Preferably the W/O emulsion according to the invention comprises at least one compound which has and/or results in a desirable taste. Preferably said compound is selected from the list consisting of sodium chloride, monosodium glutamate, vanilla extract, yuzu, lemon juice, dairy flavour compounds, fermented milk flavour compounds, trigeminal compounds, protein and sugar; and more preferably wherein said selected compound is a water-soluble compound.

Preferably the finished W/O emulsion according to the invention comprises a health promoting compound and more preferably at least one compound selected from the list consisting of calcium, selenium, iron, zinc, copper, manganese, magnesium and phytosterols.

Other measures for the stability, besides water-phase release below 30 degrees Celsius in the controlled temperature protocol, are the average droplet size and size distribution of the dispersed aqueous phase. Said values can be expressed in D3,3 and eˆsigma value respectively. A smaller D3,3 and/or eˆsigma are indicative of an improved stability.

Preferably the W/O emulsions according to the invention have a dispersed water-phase with a D3,3 of at most 15, preferably of at most 12 and more preferably of at most 10 at ambient temperatures. Preferably W/O emulsions according to the invention have a eˆsigma of at most 2.3, preferably of at most 2.1 and more preferably of at most 1.9 at ambient temperatures.

Preferably the W/O emulsion according to the invention is a liquid margarine, a wrapper or a spread, more preferably a spread and even more preferably a low-fat spread comprising of from 10 to 40 wt. % of total fat.

The invention is now illustrated by the following non limiting examples.

EXAMPLES

Solid Fat Content (SFC) Measurements

The solid fat content (SFC) in this description and claims is expressed as N-value, as defined in Fette, Seifen Anstrichmittel 80 180-186 (1978). The stabilization profile applied is heating to a temperature of 80 degrees Celsius, keeping the oil for at least 10 minutes at 60 degrees Celsius or higher, keeping the oil for 1 hour at 0 degrees Celsius and then 30 minutes at the measuring temperature.

Water Droplet Size Distribution of Spreads (D3,3 Measurement)

The normal terminology for Nuclear Magnetic Resonance (NMR) is used throughout this method. On the basis of this method the parameters D3,3 and exp($\sigma$) of a lognormal water droplet size distribution can be determined. The D3,3 is the volume weighted mean droplet diameter and a is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the log-normal droplet size distribution—the parameters of the water droplet size distribution D3,3 (volume weighed geometric mean diameter) and a (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

The droplet size of the spread is measured, according to the above described procedure, of a spread stabilized at 5 degrees Celsius right after production for one week. This gives the D3,3 after stabilization at 5 degrees Celsius.

The C-cycle is a method to test the stability of the fat spread during storage and usage and comprises the following temperature cycle procedure right after production: one week at 5 degrees Celsius, two days at 30 degrees Celsius, four days at 15 degrees Celsius, one day at 10 degrees Celsius and finally two days at 5 degrees Celsius.

Stevens Value

Stevens values indicates a products hardness or firmness. The Stevens value was measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. The probe is pushed into the product at a speed of 2 mm/s, a trigger force of 5 gram from a distance of 10 mm. The force required is read from the digital display and is expressed in grams.

Release of the Water-Phase

A sample of 1 gram of a W/O emulsion was placed in a sample holder. The holder is made of semi-permeable material allowing for the diffusion of ions. The sample holder is itself placed in to a double walled glass vessel containing 130 millilitre of nano pure water of about 20 Degrees Celsius, which is stirred at 50 rpm. The cooling medium flowing through the double wall was thermostated by a Lauda laboratorium water bath. The temperature protocol of the water bath was as follows:

(1) From 20 to 30 Degrees Celsius at 1 Degrees Celsius per minute
(2) From 30 to 50 Degrees Celsius at 0,2 Degrees Celsius per minute
(3) From 50 to 70 Degrees Celsius at 1 Degrees Celsius per minute The conductivity of the water-system was monitored throughout the protocol and expressed as Ohm per cm.

At regular intervals during the protocol a water sample was analyzed to determine the type of salt and the salt concentration using Inductively Coupled Plasma Mass Spectrometry.

Based on the conductivity profile, the water-phase release was calculated according to the following method for Example 1 and Comparative A. The conductivity at 100% of the water-phase release is taken as the 100% water-phase release. This situation can be easily assessed by analyzing the water-phase volume and concentrations of compounds found therein in the emulsion to be analysed and adding such to the buffer system. The conductivity of this simulated 100% released water-phase is measured throughout the temperature protocol to be able to note (and correct) for temperature dependent conductivity changes. The conductivity of the base buffer is taken as the 0% water-phase release line. Also for the 0% water-phase release conditions, the conductivity is measured throughout the temperature protocol to be able to note (and correct) for temperature dependent conductivity changes.

It will be appreciated that during actual analysis of an emulsion sample, at different time-points throughout the protocol the conductivity will lie between the simulated 0% and 100% water-phase release lines. The % of water-phase released of the sample is calculated based on the conductivity of the buffer-system at that temperature point. Using a X, Y graph with the conductivity on the X-axis and the water-phase release on the Y-axis; a straight line can be drawn between the simulated 0% water-phase release conductivity point and the simulated 100% water-phase-release conductivity point for the relevant temperature. Then, knowing the conductivity of the sample at a certain temperature during the protocol, the amount of water-phase release can be read.

Salty Taste

The taste of W/O emulsions were assessed by an expert panel of 15 people. The W/O emulsion were classified from 0 to 4, wherein:

0 indicates no salty taste.
1 indicates the presence of some salty taste
2 indicates the presence of a salty taste
3 indicates the presence of a pronounced salty taste
4 indicates a strong salty taste comparable to that of the second W/O emulsion.

Free Water

After spreading a sample of a fat spread, the presence of free water was determined by using indicator paper (Wator, ref 906 10, ex Machery-Nagel, DE) which develops dark spots where free water is absorbed.

A six point scale is used to quantify the quality of fat spread (DIN 10 311):

0 (zero) is a very stable and good product showing no perceivable coloring of the paper;
1 (one) some lose of moisture (one or two spots, or the paper changes a little in color as a total);
2 (two) as one but more pronounced;
3 (three) as one but with a clear spots and color change of the paper;
4 (four) indicator paper completely changes into a darker color;
5 (five) the paper darkens completely and fast into the maximum level of color intensity.

Spreads with a score of 4 or 5 have an unacceptable level of free water. Spreads with a score of 0 or 1 have an acceptable occurrence of free water.

Oral Response

A good oral response of the W/O emulsion is associated with the destabilization of at least part of the droplets at in-mouth conditions and release of at least part of the water-phase. The destabilization of droplets at specific temperature can be observed under a microscope equipped with a Peltier element and a temperature cell to allow for temperature control of the sample.

Microscope and instrumentation used:
(1) Carl Zeiss Axioskop Universal Microscope (Zeiss LD Epiplan 10×/0.25DIC)
(2) 0.01 mm sample holder, object glass
(3) Sony Video Camera DFW-SX900/Dell Computer (Fire-I capture software)
(4) Linkam LTS120 Large Sample Peltier Stage (CO102, LTS-PE94-controller)

The following types of observations were noted:
(1) First droplets coalescing (first signs of collapsing of tiny droplets)
(2) A lot of Coalescence, starting to break
(3) Start Flowing, start collapsing
(4) Complete Collapse starting)
(5) Completely broken, hardly any change anymore Rheology Measurement The waxiness of the W/O emulsions was measured with a TAAR2000 rheometer (TA Instruments), and a 40 mm parallel sandblasted plate (500µ gap) geometry in continuous oscillation at a constant frequency (5 Hz) and a controlled strain of 10%. The storage (G') and loss (G") moduli where determined wherein the G' and G" were measured during a temperature sweep of the W/O emulsion. A 0.7 gram sample of a W/O emulsion was placed on bottom plate of the rheometer and equilibrated to 10 degrees Celsius. Next the sample temperature was raised from 10 to 60 degrees Celsius and lowered back down again to 10 degrees Celsius. The temperature was changed in steps of 0.5 degrees Celsius and at each step the sample was maintained for 3 seconds. The loss modulus was determined at 30 and 35 degrees Celsius.

W/O Emulsion Production

The compositions of the W/O emulsion used in the experiments are set out in Table 1.

teurized. The water-phase was pumped through a tubular heat exchanger and cooled to 6-8 degrees Celsius just before mixing with the fat mixture.

The fat mixture was made by dispersing colorant and the stock solution of the emulsifier at about 55 degrees Celsius in liquid oil. The liquid oil was cooled to 14 degrees Celsius and subsequently the fat-powder, pre-cooled to 5 degrees Celsius, was added. The oil and fat-powder were homogenized and degassed under vacuum using a Fryma-Delmix colloid mill system. The fat feed tank was thermo-stated at 16 degrees Celsius.

The fat feed tank and the aqueous feed tank feed were pumped via a junction point into a 150 ml double walled

TABLE 1

Composition of W/O emulsions used to make Examples 1 to 4 and Comparative A, numbers represent wt. %.

|  | Emulsion 1 | Emulsion 2 | Emulsion 3 | Emulsion 4 | Emulsion 5 | Emulsion 6 | Comp. A |
|---|---|---|---|---|---|---|---|
| FAT-PHASE |  |  |  |  |  |  |  |
| [1,3]Fat powder | 18 | 18 | 6 | 6 | 6 | 6 | 12 |
| [1]Dimodan RT | 0.86 | 0.86 | 0.86 | 0.86 | 0.86 | 0.86 | 0.86 |
| [1]Vitamins and colorant | 0.2 | 0.2 | 0.2 | 0.2 | 0.2 | 0.2 | 0.2 |
| [1]Sunflower oil | Balance | Balance | Balance | Balance | Balance | Balance | Balance |
| WATER-PHASE |  |  |  |  |  |  |  |
| [2]NaCL | 1.54 | 0 | 1.54 | 2.15 | 2.62 | 3.08 | 1.54 |
| [2]Potassium sorbate | 0.08 | 0.08 | 0.08 | 0.08 | 0.08 | 0.08 | 0.08 |
| [2]Citric acid 20% | 0.015 | 0.015 | 0.015 | 0.015 | 0.015 | 0.015 | 0.015 |
| [2]Water | Balance | Balance | Balance | Balance | Balance | Balance | Balance |
| W/O emulsions: |  |  |  |  |  |  |  |
| Total Fat-phase | 35 | 35 | 35 | 35 | 35 | 35 | 35 |
| Total Water-phase | 65 | 65 | 65 | 65 | 65 | 65 | 65 |

[1]based on total fat;
[2]based on total water-phase
[3]The fat powder was obtained using a supercritical melt micronisation process similar to the process described in Particle formation of ductile materials using the PGSS technology with supercritical carbon dioxide, P. Münüklü, Ph.D. Thesis, Delft University of Technology, 16 Dec. 2005, Chapter 4, pp. 41-51. The fat powder consisted of an interesterified mixture of 65% dry fractionated palm oil stearin with an Iodine Value of 14 and 35% palm kernel oil.

The hardstock fat (comprised by the fat powder) was characterized by the following solid fat content:

TABLE 2

| Solid fat content. | |
|---|---|
| Solid fat content at: | InES48 |
| 10 degrees Celsius | 92.0 |
| 20 degrees Celsius | 83.8 |
| 30 degrees Celsius | 57.9 |
| 35 degrees Celsius | 40.8 |
| 40 degrees Celsius | 21.2 |

In other words said hardstock fat (InES48) has a N20 of 83.8, which means a solid fat content at 20 degrees Celsius of 83.8 wt. %.

Spreads Production Process

Emulsions 1 and 2 were used as 'first W/O emulsion', emulsions 3 to 6 as 'second W/O emulsion.

The first and second W/O emulsion and comparative A were provided according to the following process. All water-phase ingredients were dissolved at a temperature of 60 degrees Celsius and the water-phase was subsequently passtainless steel pin stirrer, with two rows of 4 stator and rotor pins. The pin stirrer is thermo-stated at 8° C. and operated at 2400 rpm.

The first (emulsions 1 and 2) and second emulsions (emulsions 3 to 6) were mixed to provide the W/O emulsions according to the invention as detailed in Table 3.

TABLE 3

| Composition of Example 1 to 4 according to the invention | | | | |
|---|---|---|---|---|
|  | Ex. 1 | Ex. 2 | Ex. 3 | Ex. 4 |
| Emulsion 1 | 50 wt. % | — | — | — |
| Emulsion 2 | — | 50 wt. % | 50 wt. % | 50 wt. % |
| Emulsion 3 | 50 wt. % | — | — | — |
| Emulsion 4 | — | 50 wt. % | — | — |
| Emulsion 5 | — | — | 50 wt. % | — |
| Emulsion 6 | — | — | — | 50 wt. % |

Example 1 to 4 are emulsions according to the invention.

To ensure low-shear mixing; Example 1 to 4 were obtained by mixing in a static mixer (Kenics-type) with internal diameter of 10 mm (Sulzer, C H) comprised of 6 elements, each having 6 blades at a flow-rate of 200 kg/h Results of Example 1 to 4 and Comparative A The stability of Examples 1 to 4 and the Comparative A was assessed by measuring D3,3 and the hardness. A typical was to test stability of an emulsion is to subject the emulsion to an adverse temperature regime, such a C-cycle.

TABLE 4

Stability assessment:

| | D3,3 after C-cycle | Hardness after C-cycle |
|---|---|---|
| Example 1 | 3.9 | 98 |
| Example 2 | 5.3 | 99 |
| Example 3 | 4.7 | 119 |
| Example 4 | 5.1 | 127 |
| Comparative A | 3.8 | 98 |

Clearly, the W/O emulsions according to the invention (Example 1 to 4) have good stability. This is shown by the emulsions having a relatively small average droplet size of the dispersed water-phase even after being subjected to a C-cycle (i.e D3,3 below <15 um). In addition said emulsions maintain a good hardness even after C-cycle treatment.

Examples 1 to 4 and Comparative A were evaluated by a panel of 15 people to assess the Salty-taste score (Table 5). The scores for each sample were averaged.

TABLE 5

Salty-taste Score:

| | Taste Score | Average wt. % of salt |
|---|---|---|
| Example 1 | 2.2 | 1 |
| Example 2 | 2.6 | 0.7 |
| Example 3 | 2.4 | 0.85 |
| Example 4 | 3.6 | 1 |
| Comparative A | 1.4 | 1 |

The panel test clearly shows taste enhancement of compounds formulating mainly (i.e. more than 55 wt. %) in the water-phase of the second W/O emulsion. In case of Examples 2, 3 and 4 essentially all the salt was originally formulated in the water-phase of the second emulsion (see also Table 1). In case of Example 1 and Comparative A the salt was about evenly distributed over the water-phase of the first and second W/O emulsion (see also Table 1).

Use of the process according to the invention also provides the possibility of reducing the amount of compound with a desirable taste, without a concomitant loss of taste experience (compare Comparative A, with 1% salt to Example 2 with 0.7% salt).

Salt-Release Profile

The water release profile of the examples 1 to 4 and the Comparative A was measured (Table 6). The wt. % salt-phase release is the cumulative amount of salt, based on the total amount of salt comprising by the W/O emulsion, released up to that temperature (i.e. time-point) in the controlled temperature protocol.

TABLE 6 water-release profile

| Degrees Celsius | Wt. % salt released | | | | |
|---|---|---|---|---|---|
| | Ex. 1 | Ex. 2 | Ex. 3 | Ex. 4 | Comp. A |
| 21 | 2.16 | 2.16 | 1.54 | 1.26 | 3.45 |
| 25 | 2.45 | 2.76 | 1.94 | 1.76 | 3.66 |

TABLE 6-continued water-release profile

| Degrees Celsius | Wt. % salt released | | | | |
|---|---|---|---|---|---|
| | Ex. 1 | Ex. 2 | Ex. 3 | Ex. 4 | Comp. A |
| 30 | 2.76 | 3.23 | 2.21 | 2.11 | 3.77 |
| 31 | 2.76 | 3.25 | 2.32 | 2.18 | 3.88 |
| 32 | 2.83 | 3.37 | 2.42 | 2.28 | 3.91 |
| 33 | 2.83 | 3.48 | 2.48 | 2.38 | 3.97 |
| 34 | 2.89 | 3.59 | 2.54 | 2.47 | 4.03 |
| 35 | 2.94 | 3.69 | 2.63 | 2.55 | 4.12 |
| 36 | 3.06 | 3.83 | 2.72 | 2.66 | 4.26 |
| 37 | 3.17 | 3.96 | 2.88 | 2.88 | 4.52 |
| 38 | 3.33 | 4.32 | 3.10 | 3.39 | 5.14 |
| 39 | 3.82 | 5.30 | 3.96 | 4.69 | 7.01 |
| 40 | 5.94 | 12.05 | 9.16 | 8.86 | 11.04 |
| 41 | 11.44 | 24.36 | 17.63 | 16.68 | 17.04 |
| 42 | 22.34 | 35.19 | 31.71 | 38.99 | 22.57 |
| 43 | 30.64 | 64.19 | 56.76 | 68.29 | 27.98 |
| 44 | 34.93 | 85.52 | 87.52 | 92.11 | 32.91 |
| 45 | 40.59 | 97.61 | 98.96 | 98.62 | 36.57 |
| 46 | 54.32 | >99 | >99 | 98.87 | 40.85 |
| 47 | 81.35 | >99 | >99 | >99 | 49.83 |
| 48 | 91.39 | >99 | >99 | >99 | 71.57 |
| 49 | 98.02 | >99 | >99 | >99 | 84.33 |
| 50 | >99 | >99 | >99 | >99 | >99 |
| 51 | >99 | >99 | >99 | >99 | >99 |

The Examples 1 to 4 are stable at ambient temperature, yet have a good water-phase release above ambient temperatures (e.g. 30 wt. % of the water-phase is released at a temperature of 43 degrees Celsius). For example in case of Example 1 at 47 degrees Celsius 81 wt. % of the water-phase was released, while for the comparative A only 50 wt. % of the water-phase was released. Therefore, clearly the water-phase release is improved when compared to Comparative A.

Reduced Waxy Mouth-Feel

The degree to which Example 1 and Comparative A showed a waxy mouth-feel at typical in-mouth temperatures was estimated by measuring visco-elasticity of the W/O emulsions (G") (Table 7)

TABLE 7

Visco-elastic loss modulus of W/O emulsions

| | G" (Pa) | |
|---|---|---|
| Degrees Celsius | Ex. 1 | Comp. A |
| 30 | 360 | 587 |
| 35 | 143 | 283 |

Clearly, the W/O emulsions according to the invention are both stable at ambient conditions and have an improved (i.e. reduced waxy) mouth-feel.

Improved Resistance to Destabilizing Effect of Health Promoting Compounds

TABLE 8

Composition of W/O emulsions used to make Example 5 and Comparative B, numbers represent wt. %.

| | Emulsion 7 | Emulsion 8 | Comp. B |
|---|---|---|---|
| FAT-PHASE | | | |
| [1,3]Fat powder | 6 | 18 | 12 |
| [1]Dimodan HP | — | 0.17 | |

TABLE 8-continued

Composition of W/O emulsions used to make Example 5 and Comparative B, numbers represent wt. %.

|  | Emulsion 7 | Emulsion 8 | Comp. B |
|---|---|---|---|
| ¹Dimodan RT/B | 0.7 | 0.83 | 1 |
| ¹Vitamins and colorant | 0.23 | 0.23 | 0.23 |
| ¹Sunflower oil | Balance | Balance | Balance |
| WATER-PHASE |  |  |  |
| ²NaCL | 5 | — | 2.5 |
| ²Potassium sorbate | 0.14 | 0.14 | 0.14 |
| ²Tricalcium phosphate | — | 6.43 | 3 |
| ²Xanthan Gum | — | 0.03 | 0.07 |
| ²Calcium disodium EDTA | 0.01 | 0.01 | 0.01 |
| ²Flavorants | 0.06 | — | 0.03 |
| ²Water | Balance | Balance | Balance |
| W/O emulsions: |  |  |  |
| Total Fat-phase | 28 | 28 | 28 |
| Total Water-phase | 72 | 72 | 72 |

¹based on total fat;
²based on total water-phase. The pH of the water-phase was set to 4.5 by addition of lactic acid (20 wt. % stock solution).
³The fat powder was obtained using a supercritical melt micronisation process similar to the process described in Particle formation of ductile materials using the PGSS technology with supercritical carbon dioxide, P. Münüklü, Ph.D. Thesis, Delft University of Technology, 16 Dec. 2005, Chapter 4, pp. 41-51. The fat powder consisted of an interesterified mixture of 65% dry fractionated palm oil stearin with an Iodine Value of 14 and 35% palm kernel oil.

Spreads Production Process for Example 5 and Comparative B

The first (Emulsion 7) and second W/O emulsion (Emulsion 8) and comparative B were provided according to the following process. All water-phase ingredients were dissolved at a temperature of 60 degrees Celsius and the water-phase was subsequently pasteurized. The water-phase was pumped through a tubular heat exchanger and cooled to 6-8 degrees Celsius just before mixing with the fat mixture.

The fat mixture was made by dispersing colorant and the stock solution of the emulsifier at about 55 degrees Celsius in liquid oil. The liquid oil was cooled to 14 degrees Celsius and subsequently the fat-powder, pre-cooled to 5 degrees Celsius, was added. The oil and fat-powder were homogenized and degassed under vacuum using a Fryma-Delmix colloid mill system. The fat feed tank was thermo-stated at 16 degrees Celsius.

The fat feed tank and the aqueous feed tank feed were pumped via a junction point into a 150 ml double walled stainless steel pin stirrer, with two rows of 4 stator and rotor pins. The pin stirrer is thermo-stated at 8° C. and operated at 2400 rpm.

Emulsions 7 (the first W/O emulsion) and emulsions 8 (the second W/O emulsion) were mixed in a weight ration of 1:1 to provide the W/O emulsion Example 5.

Results of Example 5 and Comparative B

The W/O emulsions (Ex. 5 and Comp. B) were stored at 5 degrees Celsius for one week. Under these conditions both Example 5 and Comparative B were found to be stable. However, expert tasting revealed that the W/O emulsion of Example 5 had a better appearance (less glossy), and more butter-like structure and an improved water-phase release and more salty taste than Comparative B.

Furthermore, the stability and Stevens value of Example 5 and Comparative B were analyzed after C-cycle treatment (Table 9).

TABLE 9

Analysis of Example 5 and Comparative B after C-cycle treatment.

|  | Ex. 5 | Comp. B |
|---|---|---|
| Stevens value | 82 | 116 |
| Free-water (0-5) | 0 | 2 |

The invention claimed is:

1. A process for the manufacture of an edible water-in-oil emulsion comprising:
   10 to 85 wt. % of liquid oil,
   0.5 to 50 wt. % of hardstock fat,
   10 to 85 wt. % of a dispersed water-phase,
comprising the steps of:
   a. providing a first water-in-oil emulsion;
   b. providing a second water-in-oil emulsion; and
   c. mixing said first and second emulsion to provide a finished edible water-in-oil emulsion;
wherein a wt. % of hardstock fat comprised by the first emulsion is at least 1.25 times a wt. % of hardstock fat comprised by the second emulsion, and wherein the hardstock fat comprised by the first emulsion and the hardstock fat comprised by the second emulsion each have a different solid fat profile that includes an N20 which differs at most by 30.

2. The process of claim 1, wherein the wt. % of solid fat at 20 degrees Celsius of the hardstock fat comprised by the first emulsion and the hardstock fat comprised by the second emulsion differs at most by 20 wt. %.

3. The process of claim 1, wherein the solid fat profile of the hardstock fat of both the first and second emulsion is characterized by the following solid fat profile:
   N10 of at least 40; and
   N20 of at least 20.

4. The process of claim 1, wherein the second water-in-oil emulsion comprises from 0.2 to 40 wt. % of hardstock fat, based on the wt. % of the second water-in-oil emulsion.

5. The process of claim 1, wherein the wt. % of hardstock fat comprised by the first W/O emulsion is from 1.5 to 50 times the wt. % of hardstock fat comprised by the second W/O emulsion.

6. The process of claim 1, wherein the first or the second water-in-oil emulsion is made using fat-powder comprising hardstock fat.

7. The process of claim 1, wherein the water-phase of the second water-in-oil emulsion comprises a compound which has or results in a desirable taste.

8. The process of claim 7, wherein at least 55 wt. %, of said compound, based on the total weight of said compound in the finished water-in-oil emulsion, is comprised by the water-phase of the second water-in-oil emulsion.

9. The process of claim 1, wherein the water-phase of the first water-in-oil emulsion comprises a health promoting compound.

10. The process of claim 6 wherein the fat powder is micronized fat obtainable by super critical melt micronisation.

11. The process according to of claim 6 wherein both the first and second water-in-oil emulsions are made using fat-powder comprising hardstock fat.

12. The process of claim 1, wherein the wt. % of the hardstock fat comprised by the first W/O emulsion is from 2 to 10 times the wt. % of the hardstock fat comprised by the second W/O emulsion.

13. The process of claim 1, wherein the wt. % of the hardstock fat comprised by the first W/O emulsion is from 2.5 to 5 times the wt. % of the hardstock fat comprised by the second W/O emulsion.

14. The process of claim 1, wherein the finished edible water-in-oil emulsion has the following fat profile:
 N10 of at least 50;
 N20 of at least 30; and
 N35 of 10 to 70.

15. The process of claim 1, wherein the finished edible water-in-oil emulsion has the following fat profile:
 N10 of at least 80;
 N20 of 70 to 95; and
 N35 of 30 to 50.

* * * * *